Oct. 1, 1929.　　　J. ANDERSON　　　1,729,861
DEVICE FOR REMOVING RIMS FROM TIRES
Filed March 19, 1928　　3 Sheets-Sheet 1

Inventor
John Anderson,
By Stanley Burch
Attorney

Oct. 1, 1929.                    J. ANDERSON                    1,729,861
                    DEVICE FOR REMOVING RIMS FROM TIRES
                    Filed March 19, 1928        3 Sheets-Sheet 2
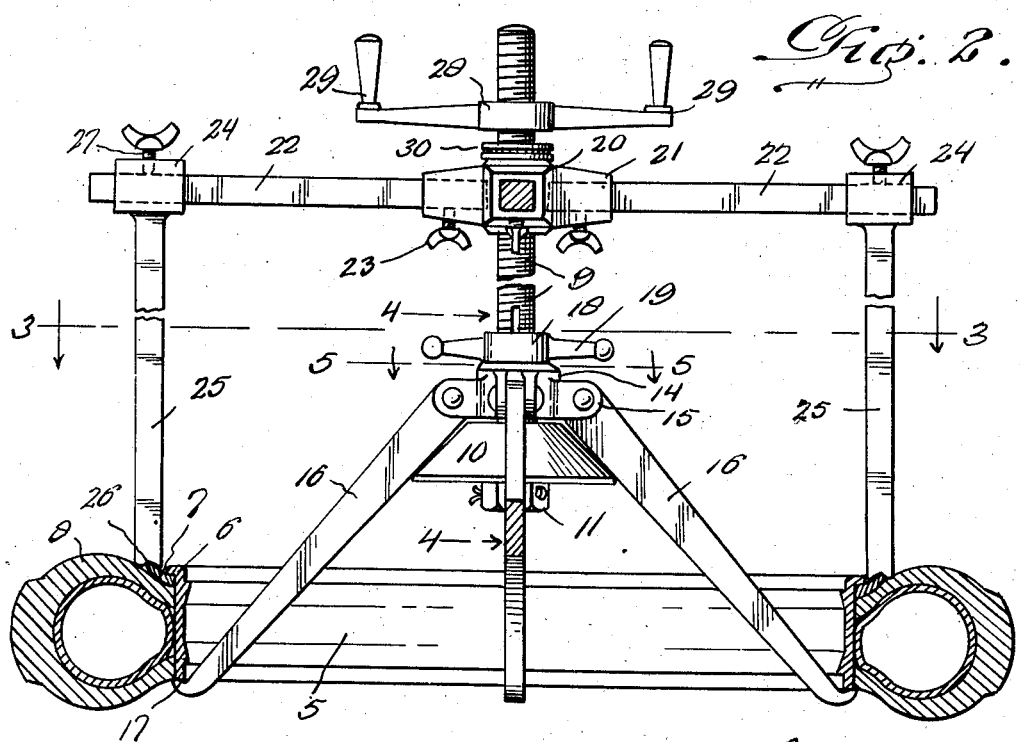
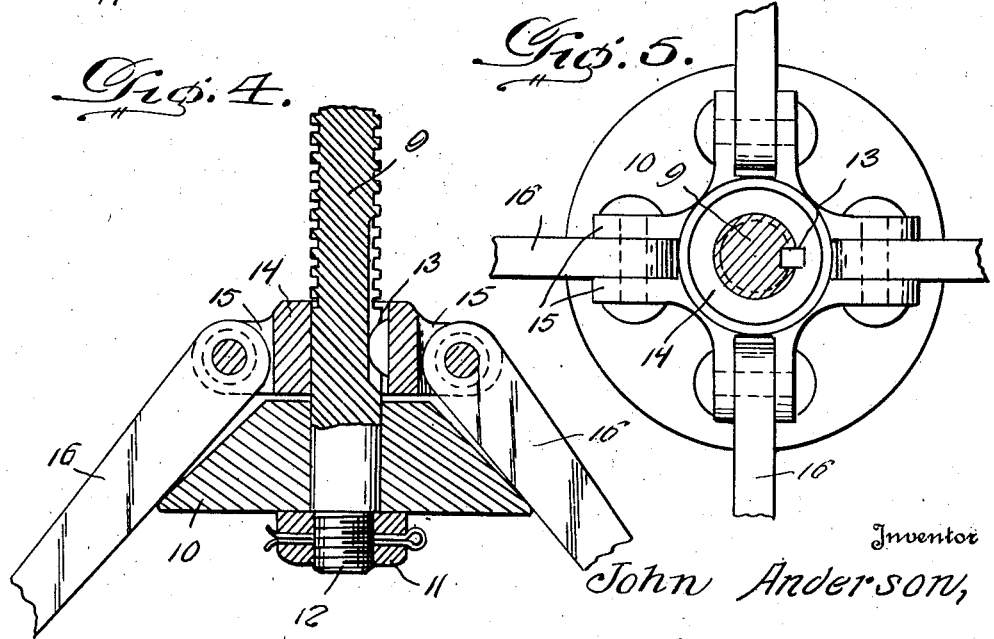
Inventor
John Anderson,
By J. Stanley Burch
Attorney

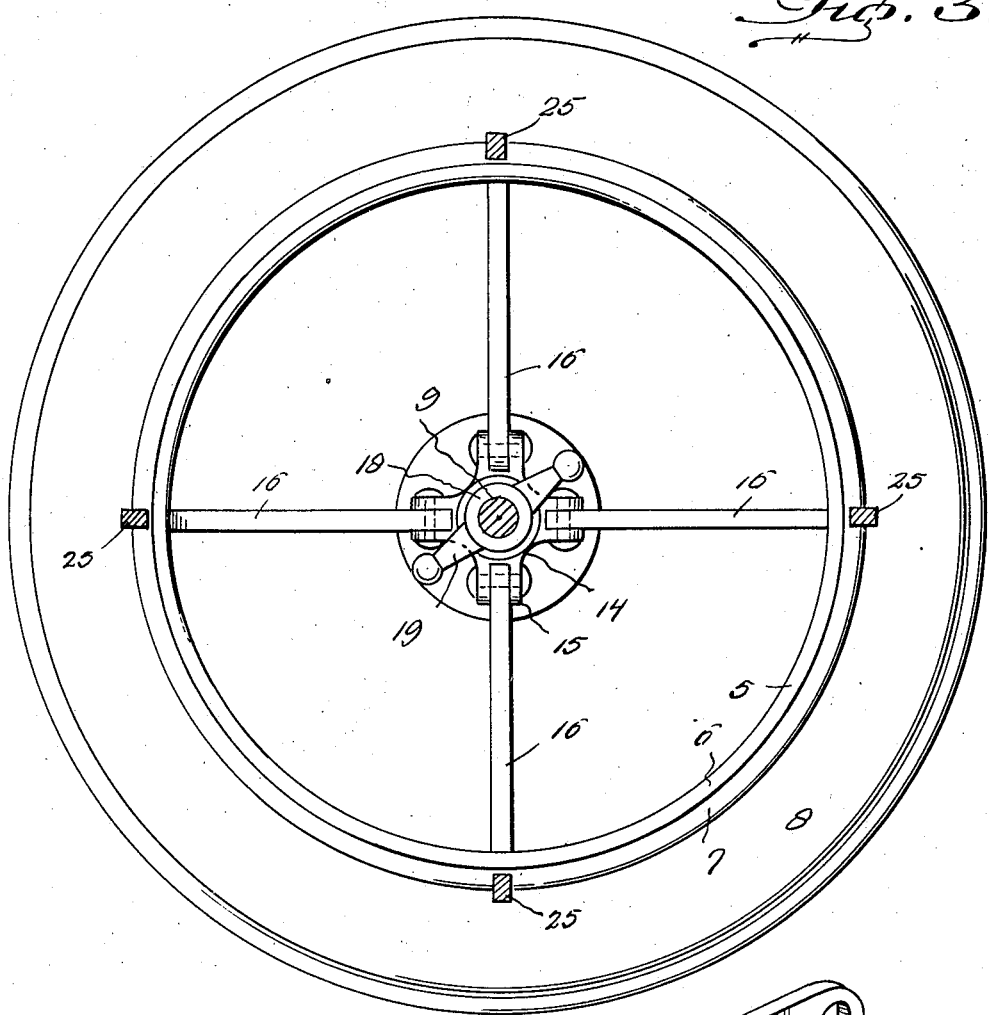
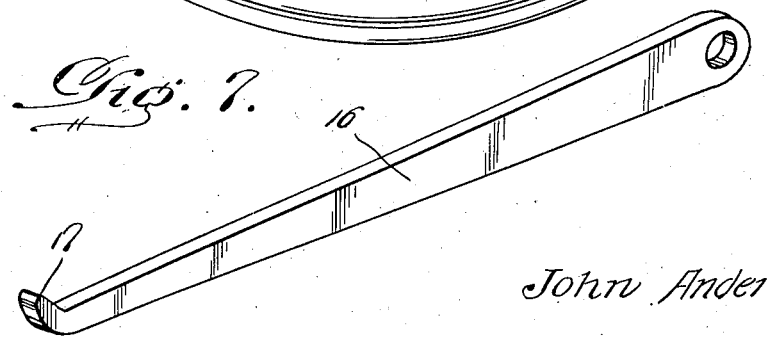

Patented Oct. 1, 1929

1,729,861

UNITED STATES PATENT OFFICE

JOHN ANDERSON, OF TULSA, OKLAHOMA

DEVICE FOR REMOVING RIMS FROM TIRES

Application filed March 19, 1928. Serial No. 262,839.

My invention relates to an improved device for use in removing rims and disk wheels from the pneumatic and other tires carried thereby, especially when the tire and rim are quite large, or when the tire has become rusted or stuck upon the rim to such a degree as to require considerable force to effect removal of the rim from the tire.

The primary object of the present invention is to provide a device of the above kind which is simple and durable in construction, efficient in use, and easy and convenient to operate.

Another important object of the invention is to provide an improved device of the above kind, which is readily adjustable for operation upon rims and tires of different sizes or diameters.

The invention consists in the novel form, combination and arrangement of parts hereinafter more fully described, shown in the accompanying drawings, and claimed.

In the drawings;

Figure 2 is a vertical section on line 2—2 of Figure 1.

Figure 3 is a horizontal section on line 3—3 of Figure 2.

Figure 4 is an enlarged fragmentary vertical section on line 4—4 of Figure 2.

Figure 5 is an enlarged fragmentary horizontal section on line 5—5 of Figure 2.

Figure 7 is a view similar to Figure 6, of one of the rim-engaging pulling arms.

Figure 1:
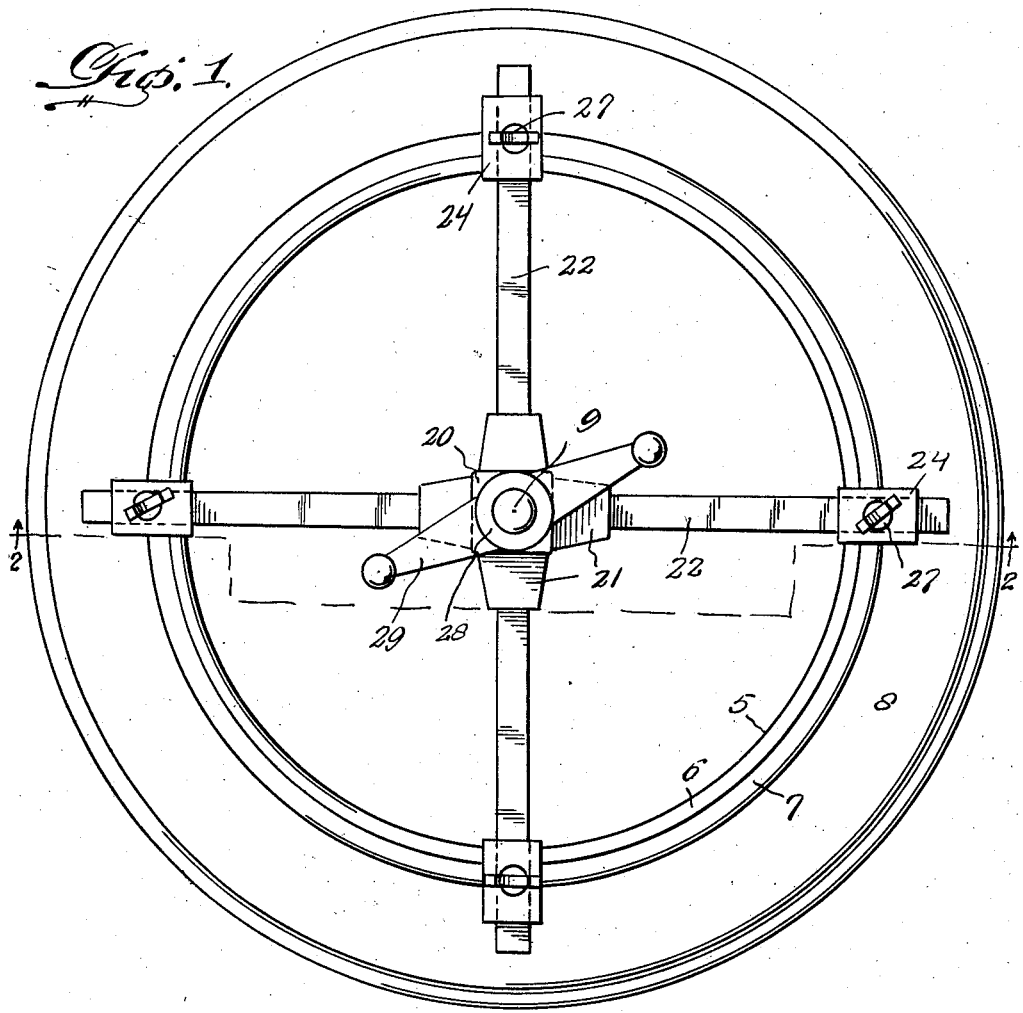
Figure 1 is a top plan view of a device embodying the present invention, and illustrating the device in use.
Figure 6:
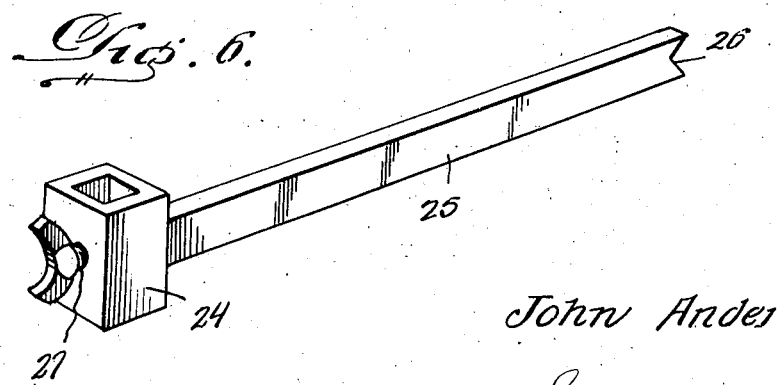
Figure 6 is an enlarged perspective view of one of the push bars of the device.

Referring more in detail to the drawings, 5 indicates a conventional form of rim such as is used on modern bus or truck wheels, and this rim has a flange 6 at one side. Another detachable flange or side ring 7 is formed to fit against the inner side of the flange 6 and to curve outwardly and laterally. The tire retaining means for the other side of the rim varies with different kinds of rims, the type of rim shown being that in which a side flange is provided on the wheel felly to form the tire retaining means at said other side of the rim. The usual pneumatic tire 8 is shown in place on the rim with one of its beads disposed against the ring 7.

The illustrated embodiment of the present invention includes a vertical threaded stem or jack screw 9 upon the lower end portion of which is fitted a cone-shaped member 10 which is held in place by a lock nut 11 placed upon the threaded reduced extension 12 provided on the lower end of the screw 9. Slidably keyed, as at 13, on the screw 9, directly above the member 10, and to hold the screw 9 against turning, is a vertically adjustable collar 14 having a plurality of uniformly spaced pairs of radially projecting ears 15, between each pair of which is pivoted the inner or upper end of a vertically swinging pulling arm 16 having an outwardly extending lateral lower or outer end portion forming a shoulder 17 adapted to engage under the lower side edge of the rim 5 when it is disposed horizontally on a suitable supporting surface with the side with the flange 6 uppermost, as shown in Figure 2. Threaded on the stem 9 directly above the collar 14 is an adjusting nut 18 having radial operating handles 19. It will thus be seen that the cone member 10 forms a spreader abutment for the arms 16 for causing the latter to swing outwardly into engagement with the rim 5 when the collar 14 is forced downwardly by adjusting the nut 18 downwardly, the nut 18 holding the arms 16 in the position to which they are swung. By adjusting the nut 18 and collar 14 upwardly, the free ends of the arms 16 may be retracted to partially collapse the arms, thereby enabling the device to be used upon rims of different sizes or diameters.

Slidable on the screw 9 above the nut 18 is a collar 20 having a plurality of spaced radially projecting polygonal sockets 21 in which are removably fitted the inner ends of radially extending horizontal arms 22, the arms 22 being held in the sockets 21 by set screws 23, or the like.

Slidably fitted on the arms 22 are polygonal sleeves 24 having rigid depending push bars 25 having seats 26 in their lower ends to engage the laterally directed outer edge portion of the ring 7. The push bars 25 are thus radially adjustable relative to the screw 9 to engage the rings 7 of rims of different sizes or diameters, and the sleeves 24 may be provided with set screws 27 to impinge the arms 22 and secure the sleeves 24 and bars 25 in any desired position of radial adjustment.

A second adjusting nut 28 having radial operating handles 29 is threaded on the upper end portion of the screw 9 directly above the collar 20, and a suitable anti-friction thrust bearing 30 is interposed between the nut 28 and the collar 20 to promote the ease of operation of the nut 28 when it is adjusted downwardly to force downwardly on the collar 20. When the nut 28 is thus adjusted, the screw 9 and arms 16 are elevated, thereby causing the rim 5 to be pulled upwardly out of the tire 8 while the latter is held down by the push bars 25 acting against the ring 7 and the tire.

Minor changes may be made without departing from the spirit and scope of the invention as claimed.

What I claim as new is:

1. A device for removing a rim from a tire comprising a threaded stem, a collar slidably keyed on said stem, a plurality of pulling arms pivoted to said collar and each formed with a laterally directed free end adapted to engage the lower edge of the rim, a nut engaging said threaded stem directly above said collar, a spreader member secured on the stem beneath said pulling arms for swinging the latter outwardly when said collar is forced downwardly by downward adjustment of said nut, a second collar slidable on said stem above said nut and having depending push bars arranged to have their lower ends engage the removable flange of the rim at the upper side of the tire, and a second nut engaging said threaded stem above the second collar for use in forcing the latter downwardly.

2. A device for removing a rim from a tire comprising a threaded stem, a collar slidably keyed on said stem, a plurality of pulling arms pivoted to said collar and each formed with a laterally directed free end adapted to engage the lower edge of the rim, a nut engaging said threaded stem directly above said collar, a spreader member secured on the stem beneath said pulling arms for swinging the latter outwardly when said collar is forced downwardly by downward adjustment of said nut, a second collar slidable on said stem above said nut and having depending push bars arranged to have their lower ends engage the removable flange of the rim at the upper side of the tire, and a second nut engaging said threaded stem above the second collar for use in forcing the latter downwardly, said second collar having radial sockets, and radial arms removably secured in said sockets and carrying said push bars.

3. A device for removing a rim from a tire comprising a threaded stem, a collar slidably keyed on said stem, a plurality of pulling arms pivoted to said collar and each formed with a laterally directed free end adapted to engage the lower edge of the rim, a nut engaging said threaded stem directly above said collar, a spreader member secured on the stem beneath said pulling arms for swinging the latter outwardly when said collar is forced downwardly by downward adjustment of said nut, a second collar slidable on said stem above said nut and having depending push bars arranged to have their lower ends engage the removable flange of the rim at the upper side of the tire, and a second nut engaging said threaded stem above the second collar for use in forcing the latter downwardly, said spreader member being cone-shaped.

4. A device for removing a rim from a tire comprising a threaded stem, a collar slidably keyed on said stem, a plurality of pulling arms pivoted to said collar and each formed with a laterally directed free end adapted to engage the lower edge of the rim, a nut engaging said threaded stem directly above said collar, a spreader member secured on the stem beneath said pulling arms for swinging the latter outwardly when said collar is forced downwardly by downward adjustment of said nut, a second collar slidable on said stem above said nut and having depending push bars arranged to have their lower ends engage the removable flange of the rim at the upper side of the tire, and a second nut engaging said threaded stem above the second collar for use in forcing the latter downwardly, said first-named collar and first-named nut being adjustable upwardly to allow inward collapsing of the pulling arms, and said push bars being removably carried by said second collar.

In testimony whereof I affix my signature.

JOHN ANDERSON.